(12) United States Patent
Gloekler et al.

(10) Patent No.: US 7,394,372 B2
(45) Date of Patent: Jul. 1, 2008

(54) METHOD AND APPARATUS FOR AGGREGATING AND COMMUNICATING TRACKING INFORMATION

(75) Inventors: John S. Gloekler, Oakland, CA (US); Geoffrey Smith, Mt. Gravatt East (AU); Gordon Foyster, Mooball (AU)

(73) Assignee: G2 Microsystems Pty. Ltd., Haymarket (AU)

(*) Notice: Subject to any disclaimer, the term of this patent is extended or adjusted under 35 U.S.C. 154(b) by 85 days.

(21) Appl. No.: 11/026,185

(22) Filed: Dec. 29, 2004

(65) Prior Publication Data

US 2005/0258955 A1 Nov. 24, 2005

Related U.S. Application Data

(60) Provisional application No. 60/533,329, filed on Dec. 30, 2003.

(51) Int. Cl.
*G08B 13/14* (2006.01)

(52) U.S. Cl. ............ 340/572.1; 340/572.4; 340/539.13; 340/825.49; 235/385; 705/28

(58) Field of Classification Search ............... 340/572.1
See application file for complete search history.

(56) References Cited

U.S. PATENT DOCUMENTS

| | | | |
|---|---|---|---|
| 5,774,876 A * | 6/1998 | Woolley et al. ........... 340/572.1 |
| 5,973,599 A | 10/1999 | Nicholson et al. |
| 6,013,949 A | 1/2000 | Tuttle |
| 6,027,027 A | 2/2000 | Smithgall |
| 6,058,374 A * | 5/2000 | Guthrie et al. ................ 705/28 |
| 6,400,272 B1 | 6/2002 | Holtzman et al. |
| 6,496,806 B1 * | 12/2002 | Horwitz et al. ............ 340/10.1 |
| 6,504,503 B1 | 1/2003 | Saint-Hilaire et al. |
| 6,509,828 B2 * | 1/2003 | Bolavage et al. ........... 340/10.1 |
| 6,539,281 B2 | 3/2003 | Wan et al. |
| 6,614,349 B1 * | 9/2003 | Proctor et al. ............ 340/572.1 |
| 6,614,351 B2 | 9/2003 | Mann et al. |
| 6,624,752 B2 | 9/2003 | Klitsgaard et al. |
| 6,687,609 B2 | 2/2004 | Hsiao et al. |
| 6,700,533 B1 | 3/2004 | Werb et al. |
| 6,745,027 B2 | 6/2004 | Twitchell, Jr. |
| 6,853,294 B1 * | 2/2005 | Ramamurthy et al. .... 340/572.1 |

(Continued)

OTHER PUBLICATIONS

PCT Search Report, PCT/US04/43896, Dec. 30, 2004, G2 Microsystems PTY LTD.

(Continued)

*Primary Examiner*—George Bugg
*Assistant Examiner*—Eric M. Blount
(74) *Attorney, Agent, or Firm*—Blakely Sokoloff Taylor & Zafman LLP

(57) ABSTRACT

Tracking devices having computational and communication resources receive information from a plurality of local devices, such as passive RFID tags, and collect and process the received information to determine one or more of when, where, and in what format to forward the collected information. The tracking devices typically include hardware resources for temporal- and location-awareness. In operation, these tracking devices may receive and respond to queries from remotely located tracking entities. In some embodiments, records of the communications between the devices and the remotely located tracking entities are made, and charges for the communication services are billed to the tracking entities that receive the communication services.

25 Claims, 7 Drawing Sheets

U.S. PATENT DOCUMENTS

| | | | |
|---|---|---|---|
| 6,859,761 B2 | 2/2005 | Bensky et al. | |
| 6,892,054 B2 | 5/2005 | Belcher et al. | |
| 6,933,849 B2 | 8/2005 | Sawyer | |
| 6,934,540 B2 | 8/2005 | Twitchell, Jr. | |
| 6,943,678 B2 | 9/2005 | Muirhead | |
| 6,958,677 B1 * | 10/2005 | Carter | 340/572.1 |
| 6,962,541 B2 | 11/2005 | Overy et al. | |
| 6,963,289 B2 | 11/2005 | Aljadeff et al. | |
| 6,968,194 B2 | 11/2005 | Aljadeff et al. | |
| 6,972,682 B2 * | 12/2005 | Lareau et al. | 340/572.1 |
| 6,978,118 B2 | 12/2005 | Vesikivi et al. | |
| 6,988,079 B1 * | 1/2006 | Or-Bach et al. | 340/10.1 |
| 7,012,529 B2 * | 3/2006 | Sajkowsky | 340/572.1 |
| 7,136,832 B2 * | 11/2006 | Li et al. | 340/505 |
| 7,173,530 B2 * | 2/2007 | Lambright et al. | 340/572.8 |
| 2002/0078363 A1 | 6/2002 | Hill et al. | |
| 2003/0232598 A1 | 12/2003 | Aljadeff et al. | |
| 2004/0024644 A1 | 2/2004 | Gui et al. | |
| 2004/0024658 A1 | 2/2004 | Carbone et al. | |
| 2004/0024660 A1 | 2/2004 | Ganesh et al. | |
| 2004/0072577 A1 | 4/2004 | Myllymaki et al. | |
| 2004/0203870 A1 | 10/2004 | Aljadeff et al. | |
| 2005/0128139 A1 | 6/2005 | Misikangas et al. | |
| 2005/0131635 A1 | 6/2005 | Myllymaki et al. | |
| 2005/0156711 A1 | 7/2005 | Aljadeff et al | |
| 2005/0162269 A1 * | 7/2005 | Lambright et al. | 340/572.8 |
| 2005/0181804 A1 | 8/2005 | Misikangas et al. | |
| 2005/0197139 A1 | 9/2005 | Misikangas et al. | |
| 2005/0207381 A1 | 9/2005 | Aljadeff et al. | |
| 2005/0237184 A1 | 10/2005 | Muirhead | |
| 2005/0241548 A1 | 11/2005 | Muirhead | |
| 2006/0119471 A1 | 6/2006 | Rudolph et al. | |

OTHER PUBLICATIONS

Letter from Nextreme, LLC. 2282 University Drive, Uniontown, Pennsylvania, 15401 USA., Letter from Scott Muirhead to Mr. John Gloekler, "Re: U.S. Appl. No. 11/026,185", Sep. 2, 2006.

* cited by examiner

METHOD AND APPARATUS FOR AGGREGATING AND COMMUNICATING TRACKING INFORMATION

RELATED APPLICATIONS

This application claims the benefit of earlier filed provisional application 60/533,329, filed 30 Dec. 2003, and entitled "Item Tracking System And Device", the contents of which are incorporated herein by reference.

FIELD OF THE INVENTION

The invention relates to a system and device for tracking items. In particular, the invention relates to a system and device for tracking items throughout a supply chain for auditing and security purposes. It will be appreciated that the system and device of the present invention may be applied to a wide variety of applications other than item tracking in a supply chain.

BACKGROUND TO THE INVENTION

A major focus of companies today is the security and visibility of inventory throughout the supply chain. This is particularly important when management or processing of a high value asset is outsourced to another company. The use of Radio Frequency Identification (RFID) tags to facilitate item tacking is well known.

RFID tags are electronic devices that generally comprise a transponder and an integrated circuit programmed with unique identification information. In the context of a supply chain they are located on items and pallets of items and may be used as a replacement for barcodes to identify items.

An RFID tag reader is used to red the unique data programmed on the RFID tag. An RFID tag reader is comprised of an antenna, transceiver and a decoder and can be configured either as a handheld unit or a fixed-mount device. The reader emits radio waves in ranges of anywhere from a few centimeters to about 40 meters, depending on its power output and the radio frequency used. When an RFID tag passes through the electromagnetic zone, it detects the reader's activation signal. This zone energizes the RFID tag and enables the tag to transmit the data encoded on its integrated circuit. The reader decodes this data and it is passed to a host computer for processing.

RFID tags are generally passive tags, as discussed above, in that they have no internal power source and rely on an external source to provide power. In some instances, RFID tags may be active, in that they have an internal power source. Active RFID tags are more expensive and bulkier than passive RFID tags and, as such are generally not the preferred tracking device for item tracking.

Due to memory and processor limitations, the data stored on the RFID tag is generally little more than a unique identifier for the item. Hence, conventional systems offer little more than an electronic bar code that can be read from moderate distances.

A further disadvantage of conventional RFID tracking systems is the lack of synchronicity and integrity of the data across an entire supply chain. As different entities become involved in subsequent phases of the supply chain the effective tracking of items from source to destination becomes complex and expensive. The integration of a company's back-end systems with transport contractors and the like to enable auditing and tracking of the company's items throughout the supply chain is difficult and not scaleable.

For example, consider the situation where a transport contractor is used by a wide variety of companies to move freight. Each company has their own RFID system and the transport contractor has their own RFID system. While the transport company can read the data on the RFID tags for each company, the integration of the transport contractor's backend computer system with each company's is difficult and expensive, and hence the companies have difficulty in accurately tracking their products throughout the supply chain.

Furthermore, RFID tags do not effectively solve the security requirements of governments and companies with high value assets. In order to meet these security requirements, and prevent theft and tampering using existing solutions it is required to install tag readers at every point between the manufacturer and consumer. This is clearly not a cost sensitive, scaleable or versatile solution to item tracking throughout the supply chain.

In another aspect of item tracking, it is desirable to communicate information from a number of passive RFID tags devices associated with the items during their transit through the supply chain to entities authorized to receive such information. These passive RFID tags are typically disposed on the item, or on the item packaging, and these items may be disposed upon a pallet. Additionally, such items, and their associated passive RFID tags, may be collected into a storage area or container, and that storage area or container may provide one or more communication access portals through which inbound and outbound communications traffic must pass.

What is needed are methods and apparatus for allowing data from one or more passive RFID tags, each having limited transmission range, to be communicated to one or remote entities that are located beyond the transmission range of the passive RFID tags.

SUMMARY OF THE INVENTION

Briefly, devices having computational and communication resources receive information from a plurality of local devices, such as passive RFID tags, and collect and process the received information to determine one or more of when, where, and in what format to forward the collected information.

In a further aspect of the present invention, these devices include hardware resources for temporal- and location-awareness.

In a still further aspect of the present invention, these devices receive and respond to queries from remotely located tracking entities.

In a still further aspect of the present invention, records of the communications between the devices and the remotely located tracking entities are made and charges for the communication services are billed to the tracking entities receiving the communication services.

DETAILED DESCRIPTION

Figure 1:
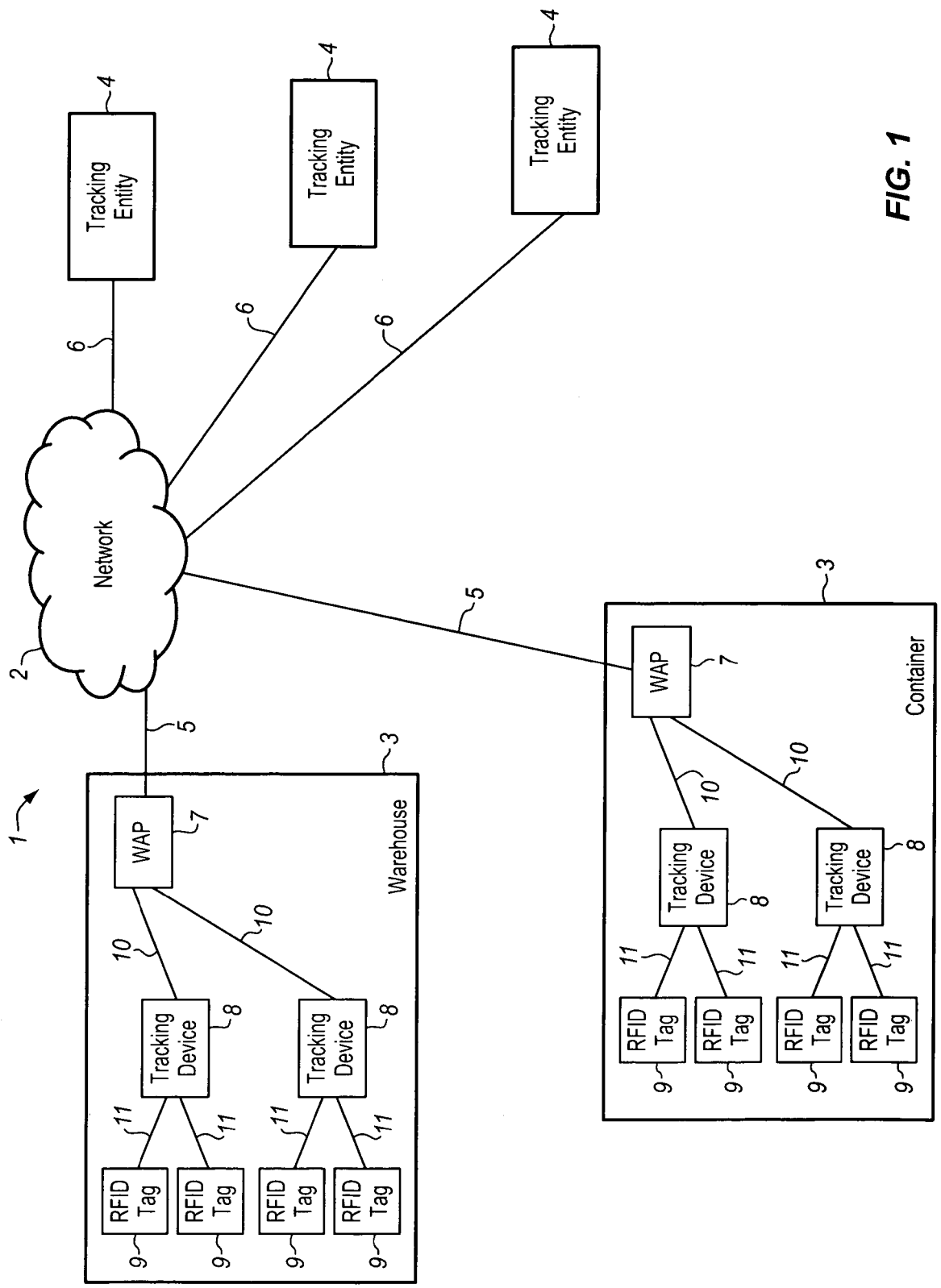
FIG. 1 shows an item tracking system according to an embodiment of the present invention.

Various embodiments of the present invention provide tracking devices having computational and communication resources. These tracking devices may be arranged in relatively close proximity so as to facilitate wireless communication with low power local devices, e.g., passive RFID tags. The tracking devices collect information from the local devices, and based on the software within the tracking devices, determinations are made regarding the scheduling of data transfer, and the addressing of data transfer packets. In a further aspect, records of the communications between tracking devices and remotely located tracking entities are made and used to bill the remote tracking entities for services provided on their behalf.

Reference herein to "one embodiment", "an embodiment", or similar formulations, means that a particular feature, structure, operation, or characteristic described in connection with the embodiment, is included in at least one embodiment of the present invention. Thus, the appearances of such phrases or formulations herein are not necessarily all referring to the same embodiment. Furthermore, various particular features, structures, operations, or characteristics may be combined in any suitable manner in one or more embodiments.

Terminology

As used herein, the expressions "communication access portal", "access portal", "communication portal", "wireless access point", "access point", and similar expressions, unless noted otherwise, refer to a communication facility through which tracking devices in accordance with the present invention may transmit messages to, and receive messages from, remotely located entities. These communication facilities are generally actively powered circuits providing wireless, typically RF, message relay services between the tracking devices and remote entities.

As used herein, the expression "tracking device" refers to an active device that includes one or more integrated circuits, and which is capable of wireless, typically RF, communication. Tracking devices are described in much greater detail below. It is noted that because, in application, tracking devices are typically attached to an item, or package, or pallet, in a fashion similar to the way in which RFID tags, are attached, the tracking devices are also referred to herein as active tags, or more simply, when the context of the description permits, as tags.

The terms chip, microchip, integrated circuit (IC), microelectronic device, semiconductor device, and monolithic device, are often used interchangeably in the field of electronics. The present invention is applicable to all the above as they are generally understood in the field.

One embodiment of a tracking device in accordance with the present invention, includes an RFID communication module, the RFID communication module in communication with one or more RFID tags; a processing module in communication with the RFID communication module; and a wireless communication module in communication with the processing module and in operative communication with an internet; wherein, the RFID communication module receives data from one or more passive RFID tags and communicates that data to the processing module, the processing module interprets the data and forwards the data to the wireless communications module, the wireless communication module communicating the data over the Internet to a destination determined by the processing module.

One embodiment of a system in accordance with the present invention includes one or more tracking entities; one or more locations, each location having: a communication portal in communication with the one or more tracking entities; one or more tracking devices, each tracking device having: (i) a wireless communication module in communication with the communication portal; (ii) a processing module in communication with the wireless communication module; and (iii) and RFID communication module in communication with the processing module; one or more passive RFID tags in communication with at least one tracking device; wherein the tracking device is able to read data from the one or more passive RFID tags and communicate the data to the one or more tracking entities.

FIG. 1 shows an item tracking system 1 according to a first embodiment of the present invention. Tracking system 1 has a network 2, a plurality of locations 3 and a plurality of tracking entities 4. Each location 3 is in communication with network 2 via a communication pathway 5. Similarly, each tracking entity 4 is in communication with network 2 via communication pathway 6.

Preferably, network 2 is the Internet although it will be appreciated that network 2 may be any form of communication network. As such, it will be appreciated that each of locations 3 are in operative communication with one or more of tracking entities 4. Similarly, each tracking entity 4 may be in operative communication with one or more locations 3. Preferably, tracking entity 4 is a supplier or distributor of items.

Location 3 has a communication portal 7 and a plurality of tracking devices 8 in communication with communication portal 7 via communication pathway 10. Location 3 further comprises a plurality of secondary tracking devices 9 in communication with primary tracking devices 8 via communication pathway 11.

Location 3 may be a storeroom, container on a ship, a truck or any entity that is used to store or move items throughout a supply chain.

In a first embodiment, location 3 is a warehouse used to store items in the supply chain. Preferably, secondary tracking devices 9 are passive RFID tags, as is known in the art, attached to items. These items may be cartons of goods stacked on a pallet, or individual high value items grouped together. Hence, secondary tracking devices 9 have encoded thereon a unique identifier that identifies the item upon which it is attached.

Tracking devices 8 are attached to a pallet upon which the items that have secondary tracking device 9 fitted thereto are located. Tracking device 8 is in communication with secondary tracking device 9 located on items on the pallet. Embodiments of tracking devices 8 are described in more detail below.

Each tracking device 8 is in communication with communication portal 7. Preferably, communication portal 7 is a wireless access point (WAP) and communication between each tracking device 8 and portal 7 is by means of wireless networks as is known in the art. Alternatively, other communication protocols may be implemented to facilitate communication between each tracking device 8 and communication portal 7.

Figure 2:
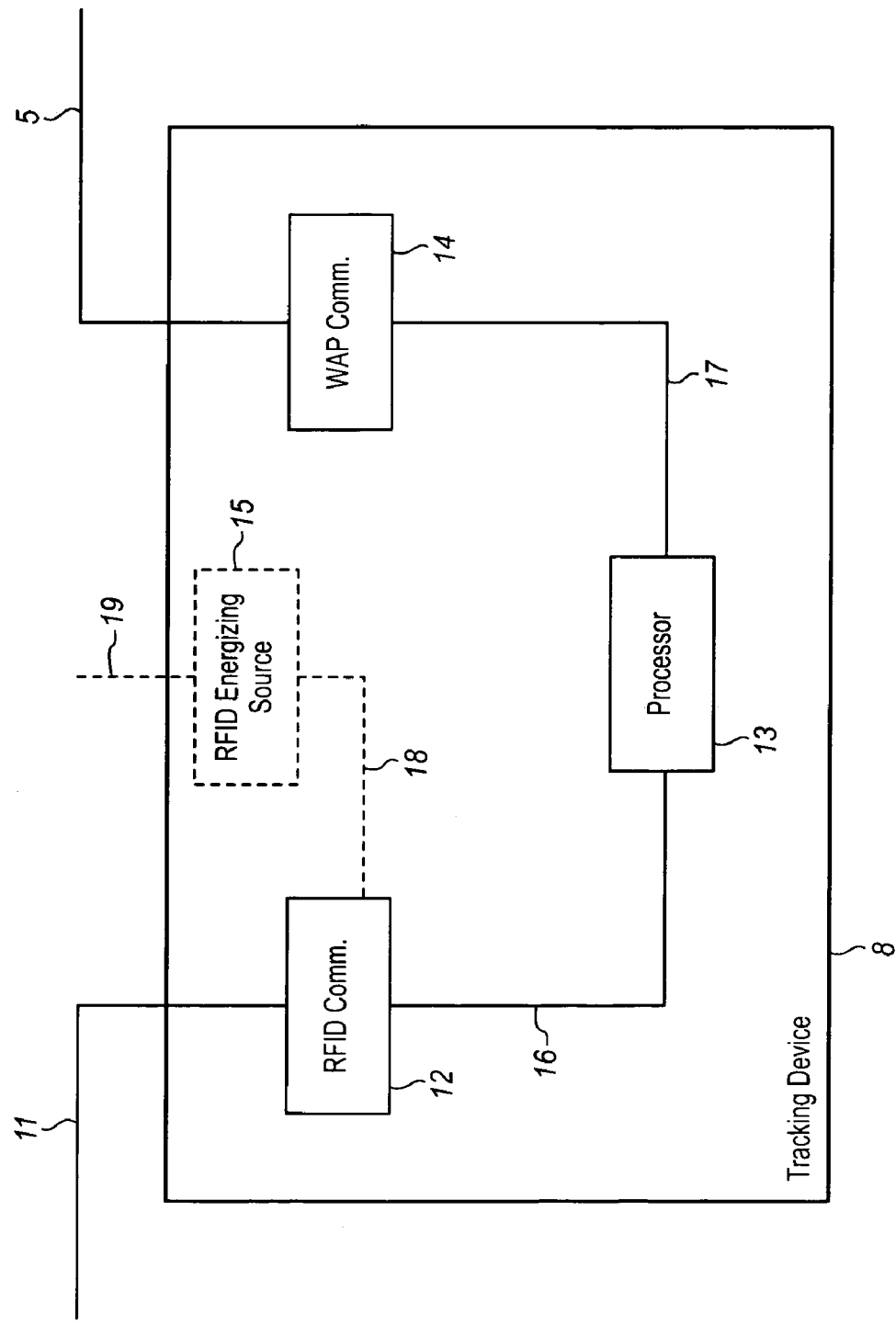
FIG. 2 shows a functional block diagram of an embodiment of a tracking device forming part of the item tracking system shown in FIG. 1.

FIG. 2 shows a functional block diagram of an embodiment of tracking device 8 forming part of tracking system 1. Tracking device 8 has a RFID communication module 13. Additionally, tracking device 8 has a wireless communication module 14 in communication via pathway 17 with processing module 13. Optionally, tracking device 8 may also have an RFID energizing source 15 for transmitting an energizing frequency upon pathway 19 to energize any secondary tracking devices 9, in the form of passive RFID tags, within range.

Communication module 12 has a wireless transmitter and receiver and associated components to control these devices. Processing module 13 preferably comprises a programmable microchip controller and associated memory. Such a microchip controller is sometimes referred to as a microcontroller. In other instances processing module 13 may be a microprocessor. Optionally, processing module 13 may comprise dedicated integrated circuits organized to perform desired functions. The implementation of tracking device 8 and its functional units will be described in more detail below.

In use, tracking system 1 tracks items throughout the supply chain. At predetermined intervals, secondary tracking devices 9 are activated by an external radio frequency source (not shown) located within location 3. Alternatively, the RFID energizing source 15 of each tracking device 8 may provide an energizing frequency to all secondary tracking devices 9 located upon items on the pallet on which each tracking device 8 is located.

Upon powering up, secondary tracking devices 9 transmit their unique identifier which is read by RFID communication module 12 of tracking device 8. As tracking devices 8 is located upon, for example, a pallet upon which items are located, each tracking device 8 receives a unique identifier from each secondary tracking device 9 located on an item stored on the pallet.

The information received from tracking devices 9 is then processed by processing module 13 on each respective tracking device 8. This information may be stored at processing module 13 or it may be communicated to wireless communication module 14 of tracking device 8.

Communication module 14 then packages this information into data packets that conform to the communication protocol that is being used between tracking device 8 and communication portal 7 and transmits this information to communication portal 7. It will be appreciated that the data communicated from tracking device 8 to communication portal 7 will have network address information present in the header of each data packet. As is known in the art, for example TCP/IP protocols, this information contains destination details for where the packets are to be delivered.

Communication portal 7 then forwards this information through the Internet 2 to one or more tracking entities 4. Tracking entities 4 have dedicated software to log this information, and to enable each tracking entity 4 to track items throughout the supply chain. In the event that items are missing, the tracking entity 4 can contact the proprietor of location 3 to notify them of this fact. Additionally, a log may be maintained so that if, for example, a particular location has a history of losing items, the tracking entity 4 can make an informed decision about which location to use for future transport/storage purposes.

In the case where information is stored at tracking device 8, processing module 13 validates certain information and communicates information to communication module 14. For example, in one embodiment of the present invention, when items are loaded onto the pallet, tracking device 8 stores the identification information from each secondary tracking device 9 attached to each item.

At regular intervals, tracking device 8 receives identification information from all tracking devices 9 located on items on the pallet. If processing module 13 of tracking device 8 detects that not all items are present on the pallet then an alert message is forwarded to one or more relevant tracking entities 4 using the process described above.

Optionally, tracking entities 4 may query tracking devices 8 for information. Hence, a tracking entity 4 may send a request over the Internet 2 requesting information or a particular action from a specific tracking device 8. The queried tracking device 8 then performs the action, or gathers the requested information, and then forwards this back to the relevant tracking entity 4.

Figure 3:
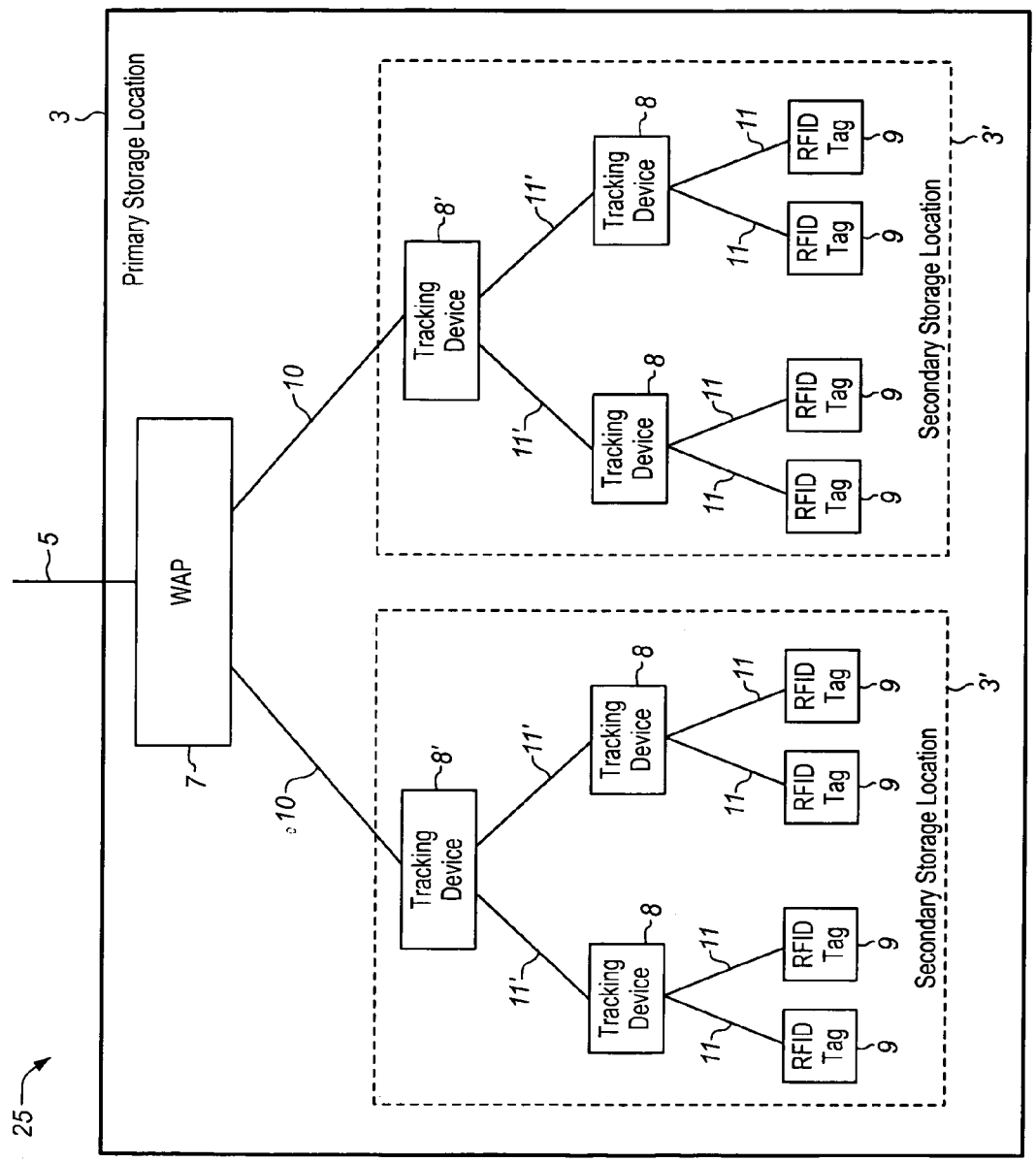
FIG. 3 shows an item tracking system according to a further embodiment of the present invention, wherein a hierarchical arrangement of tracking devices is used to communicate with the access portal.

FIG. 3 shows a partial view of item tracking system 25 as a further embodiment of the present invention. In this embodiment, location 3 has a plurality of secondary storage locations 3'. For example, location 3 may be a warehouse and location 3' may be shipping containers located in the warehouse.

As described above, tracking devices 8 are located on pallets and communicate the information from secondary tracking devices 9 located on items on the pallet. Tracking devices 8 then communicate this information to tracking device 8' located on a container in which the pallets are stored. This information is then communicated to communication portal 7 and to one or more tracking entities 4 via the Internet 2 as before. In this way, tracking entities 4 may determine not only what items are located on pallets, but what pallets and items are located within each container.

It will be appreciated that there may be many levels of hierarchy associated with the tracking system of the present invention.

Figure 4:
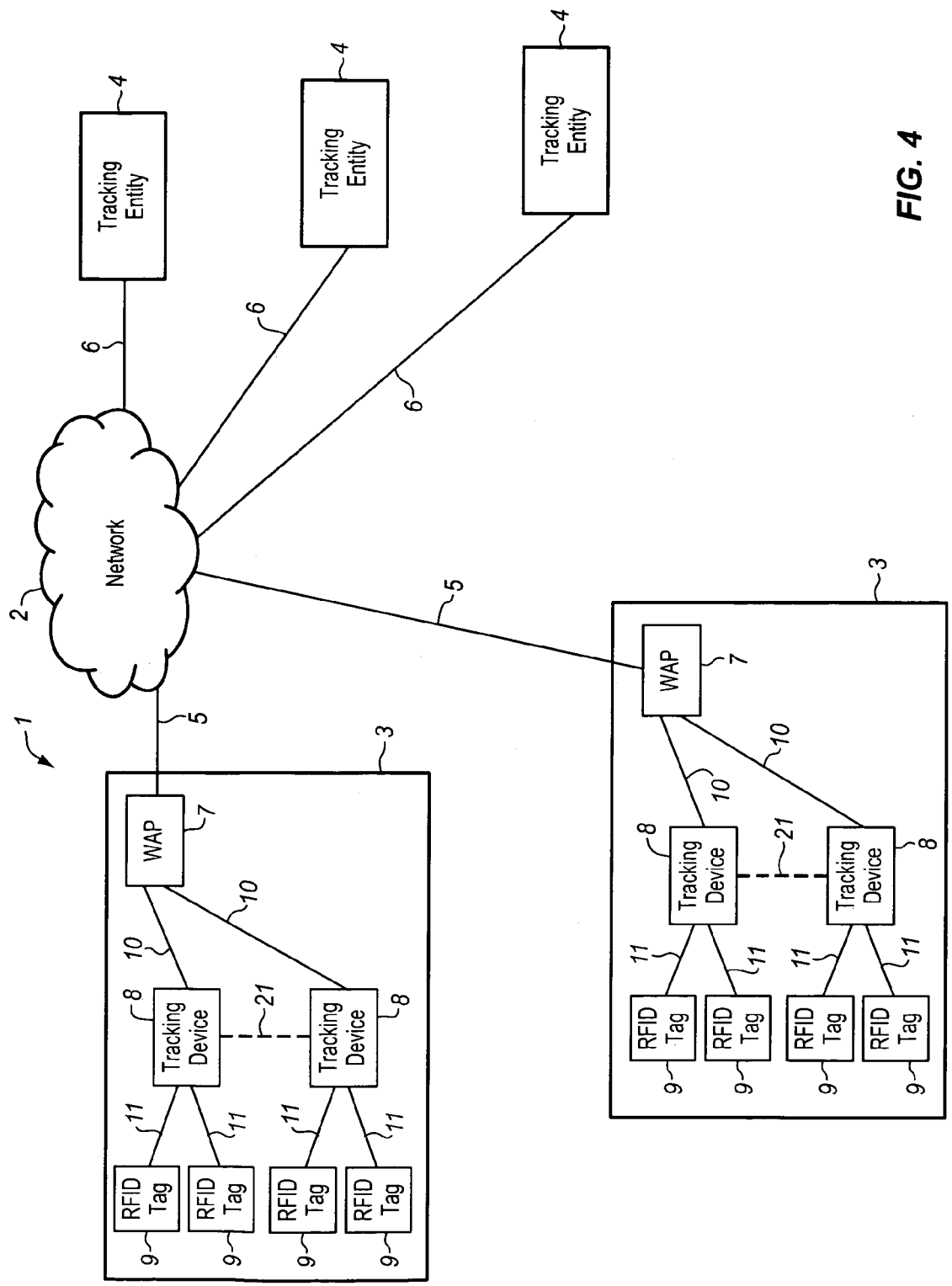
FIG. 4 shows an item tracking device according to a further embodiment of the present invention, wherein a peer-to-peer arrangement of tracking devices is used to communicate with the access portal.

FIG. 4 shows an item tracking system 1 according to a further embodiment of the present invention. In this embodiment, primary tracking devices 8 have a peer-to-peer communication pathway 21 for communication with each other. It will be appreciated that while only two tracking devices are shown in FIG. 4, peer-to-peer communication pathway 21 may exist between three or more tracking devices 8 forming a peer-to-peer network.

Any information that is sent from any tracking device 8 to tracking entity 4 passes through the peer-to-peer communication network 21 and is communicated by the closest tracking device 8 to communication portal 7. Communication along pathway 21 is facilitated by wireless communication module 14.

In this way, the power requirements of each tracking device 8 are reduced due to the lesser distance necessary to communicate information, as each tracking device 8 only requires enough transmission power to communicate with its nearest peer tracking device 8.

Figure 5:
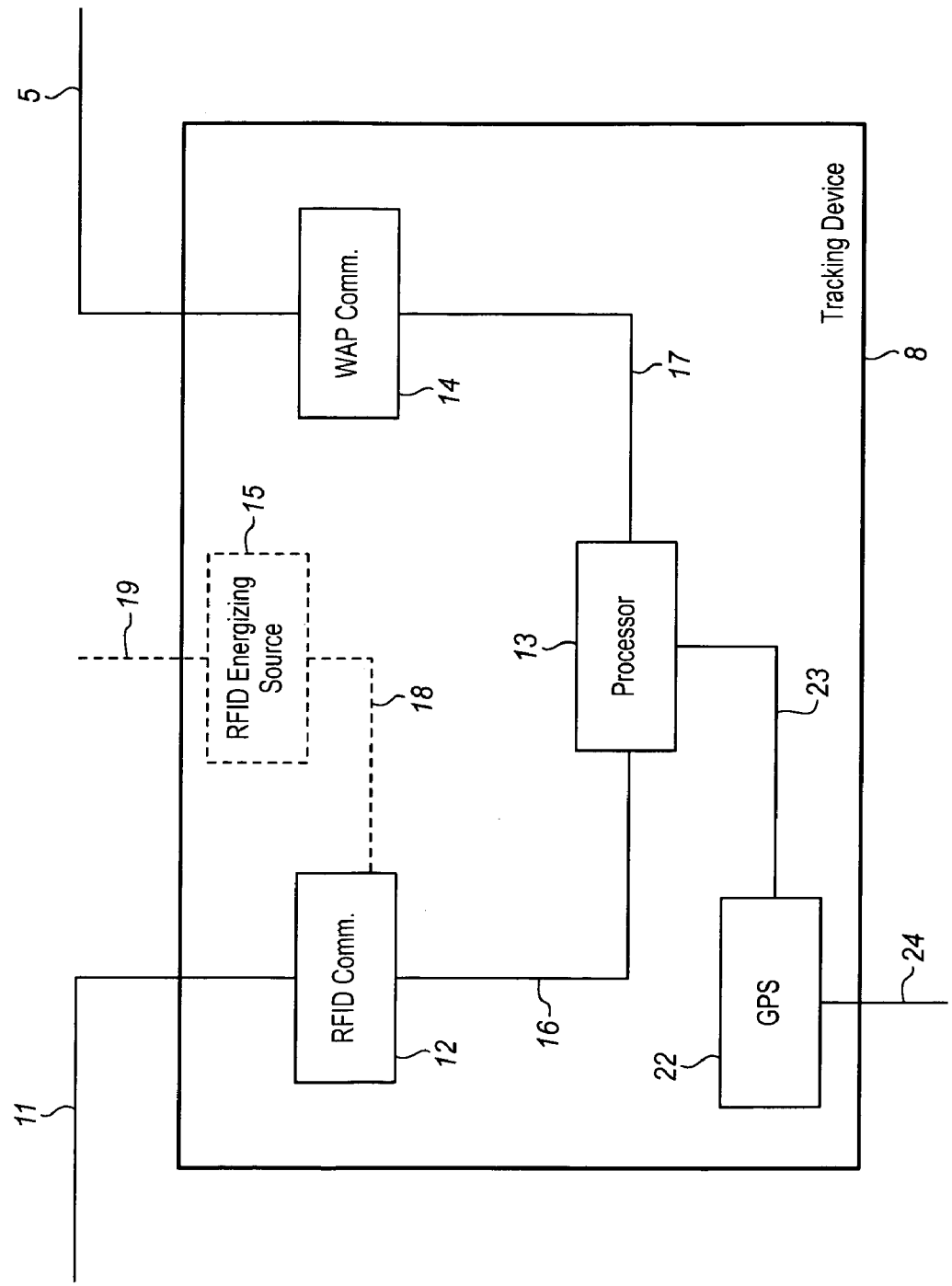
FIG. 5 shows a further embodiment of the tracking device shown in FIG. 2.

FIG. 5 shows a further embodiment of tracking device 8. In this embodiment, tracking device 8 has a Global Positioning System (GPS) module 22 in communication with processing module 13 via communication pathway 23. GPS module 22 implements known technology in order to determine the co-ordinates of tracking device 8. This information is communicated to processing module 12 for processing.

Optionally, GPS module 22 implements advanced signal processing correlation techniques to overcome the significant drop in GPS signal levels when indoors and hence provides for accurate position information to be determined when tracking device 8 is indoors. This technique has been used in Radio Astronomy applications and includes advanced correlation processing to enable GPS module 22 to extract tiny signal levels from periodic signals generated in space.

The embodiment of tracking device 8 shown in FIG. 5 has the advantage that at all times one or more tracking entities 4 can locate the precise coordinates of each tracking device 8. Preferably, tracking device 8 may sent alert messages to a tracking entity 4 when the tracking device is located outside of the bounds of a pre-determined co-ordinate area.

For example, when tracking device 8 is located on a pallet being stored within a warehouse, the co-ordinates of the interior of the warehouse are programmed within processing module 13 of tracking device 8. This may be done prior to tracking device 8 being fitted to the pallet, or may be done remotely by tracking entity 4 via the communication pathways described above. GPS module 22 determines the position of tracking device 8 at predetermined intervals and communicates this information to processing module 13. When processing module 13 receives position data from GPS module 22 that indicates that tracking device 8 has left the predetermined boundaries of the warehouse, this fact is reported to one or more tracking entities 4 as indicated above.

Optionally, all GPS data collected by GPS module 22 may be communicated to tracking entity 4 for processing. In this case, software located at tracking entity 4 interprets this information and determines whether tracking device 8 is outside of a pre-determined location for that point in time. Alternatively, tracking device 8 send its current position based on a request received from tracking entity 4.

Figure 6:
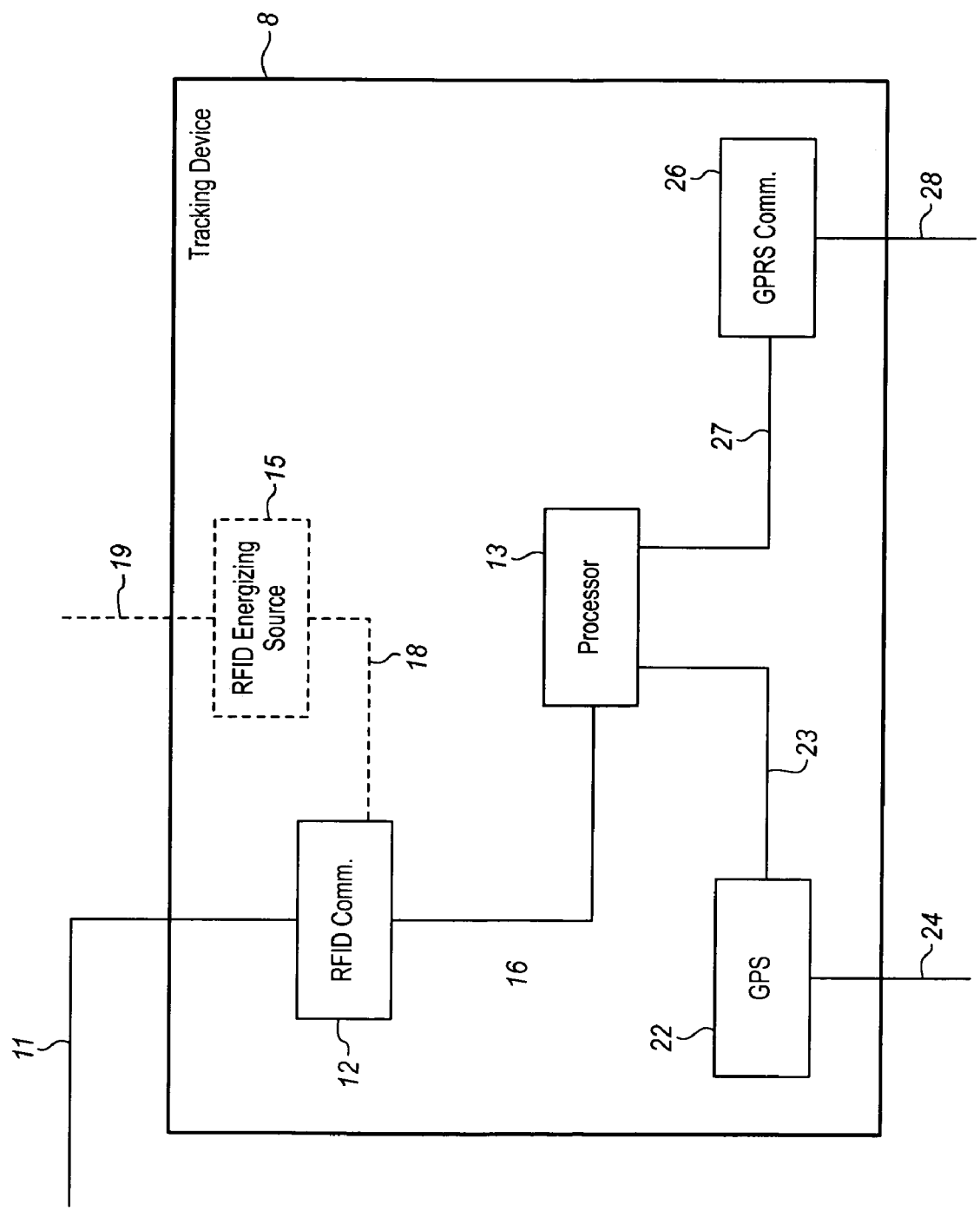
FIG. 6 shows a further embodiment of the tracking device shown in FIG. 2.

FIG. 6 shows a further embodiment of tracking device 8. In this embodiment, tracking device 8 no longer has a wireless communication module 14. This embodiment of tracking device 8 has cellular communication module in communication with processing module 13 via data pathway 27. Cellular communication module 26 is in communication with the cellular telecommunications network. In this embodiment, all data is communicated indirectly to tracking entities 4 via the communication network. Preferably, the GPRS telecommunications protocol is used to facilitate this communication although other protocols, such as but not limited to, SMS or the like, may be used.

It will be apparent that tracking entities 4 will have an interface to the telecommunications network in order to receive and send communication from and to tracking devices 8.

This embodiment of the present invention is especially advantageous for mobile tracking applications. For example, tracking device 8 may be located on a pallet on a truck and has the capability to communicate with one or more tracking entities 4 via cellular communication module 26 without the need for a physical communication link. Furthermore, GPS data can be communicated to the tracking entity to ensure that the precise location of tracking device 8, and consequently the secondary tracking devices that are in communication with tracking device 8, can be communicated to one or more tracking entities 4. In this way, for example, tracking entity 4 can be notified when a truck deviates from a predetermined route. In this example, the route of the truck is preprogrammed into the processing module 13 of each tracking device 8 and the tracking device 8 can notify one or more tracking entities 4 when the truck deviates from this preprogrammed route.

It will be appreciated that devices, such as tracking device 8, which contain both computational and communication resources, can be operated so as to cooperatively form various communication network architectures. It will further be appreciated that devices, such as tracking device 8, are suitable for a wide variety of data reception, collection, processing, formatting, and forwarding activities. Given these capabilities, tracking devices 8 may be used in conjunction with devices having lesser capabilities, such as for example, passive RFID tags, to provide efficient collection of information from a plurality of RFID tags, and to manage the communication to and/or from these RFID tags.

It will be appreciated, that based on the software within tracking device 8, a number of determinations may be made regarding the disposition of information received from the RIFD tags. Such determinations include, but are not limited to, deciding: whether to forward the information; when to forward the information; to which one or more remote entities to forward the information; whether the information is to be combined with previous and/or subsequent information from the RFID tag; whether the information is to be combined with information from other RFID tags; in what manner the data to be forwarded is formatted; whether to apply any particular encryption or compression schemes; and various combinations of the foregoing.

In one embodiment, tracking device 8 receives data from an RFID tag. Based on a unique identifier provided by the RFID tag, a rule set stored within tracking device 8 is invoked to determine the appropriate steps to take with the received data. Such determinations, and various other processing operations regarding the processing, formatting, and storing of data, are typically made by software that is executed by processing module 13. As noted above, processing module 13 may be a digital computational resource such as, but not limited to, a microprocessor, a microcontroller, or customized circuitry suitable for executing stored program instructions, along with associated memory for program and data storage, and memory required for temporary storage of variables. These computational resources, including memories, may be implemented on a single chip, on multiple chips, or as part of a System On a Chip (SOC). The present invention is not limited to any particular arrangement of the computational resources that comprise processing module 13. Such digital computational resources are extremely well known in this field, and their specifics are not described in greater detail herein. Additionally, stored programmed instructions executed by embedded computational resources are sometimes referred to as firmware rather than software. Similarly, such stored program instructions are sometimes referred to as microcode. For the purposes of this disclosure, the term software is used to refer to all stored program instructions. Furthermore, the expression stored program instructions includes all the information necessary to control the carrying out of a desired task, regardless of whether that information is characterized as data or instruction. With respect to the expression "rule set", this refers to a collection of instructions and/or data that provide the direction to a computational resource in terms of actions to be taken in response to various inputs and/or combinations of inputs.

In some embodiments, the data received by tracking device 8, from an RFID tag, may be immediately forwarded to an access portal for transmission to a remote entity that has an interest in tracking one or more items with which tracking device 8 is in communication. In this way, the remote entity will know that the RFID tag, and most likely the item associated with the RFID tag is where it is supposed to be. In other embodiments, tracking device 8 includes a real-time clock facility, and in view thereof may also transmit a timestamp with the RFID's unique identifier to indicate when the information was collected. Similarly, tracking device 8 may include a GPS module, and in view thereof may also transmit location data indicating a relatively accurate description of the item's location. It is noted that the data received from the RFID tags may include information other than the unique identifier of an RFID tag. For example, an RFID tag may also include data from one or more sensors when it makes a transmission to tracking device 8. Such sensor data may include, but is not limited to, temperature, humidity, weight, maximum detected acceleration, and so on.

In still other embodiments of the present invention, tracking device 8 may determine, based on a rule set within its software, that the data from a particular RFID tag is to be forwarded to more than one remote entity. Tracking device 8 then formats and encapsulates the data in accordance with the protocol(s) specified by the rule set for each of the intended remote entities. The appropriately formatted information is then transmitted to an access portal for forwarding to the remote entity. In some embodiments, an RFID tag may provide to tracking device 8 the destination address(es) to which data from the RFID tag is to be sent. In other embodiments, tracking device 8 determines the destination address(es) to which the data is to be sent, based, at least in part, on the unique identification data of the RFID tag, and further upon the software provided within tracking device 8.

In some embodiments the access portal provides a connection to the Internet, and the information transmitted by tracking devices 8 is communicated to one or more remote entities via the Internet. It is noted that any suitable communications network other than the Internet may be used for communicating the information transmitted by tracking devices 8. For example, tracking devices 8 may connect via the access portal to a private, wired or wireless, communications network, or to the public switched telephone network. The present invention is not limited to any particular communications pathway between tracking devices 8 and the one or more remote entities that will receive the data forwarded by tracking devices 8.

It is further noted that the access portal may also direct communications to a recipient other than a remote tracking entity. For example, a computer that tracks communications for the purpose of billing, or invoicing, remote tracking entities for the communications between tracking devices and those remote entities, may receive reports of the communication activities, or in alternative embodiments copies of the actual communications. In the latter embodiments, the remote tracking entity may optionally be billed for the storage space required to keep a backup copy of the communications records. Such billing may be based on factors such as, but not limited to, the time of day at which communications take place, the amount of data transferred, the data rate at which data is transferred, the Quality of Service requested for a particular communication, the frequency of reporting from tracking devices to remote tracking entities, specific actions requested of the tracking devices by the tracking entities, and so on, Such a computer may be in communication by way of a wired or wireless connection, or may even be completely integrated with the access portal. In some embodiments, this billing computer may engage in electronic funds transfer to collect payments for the communication services rendered. In some instances, the charges for services rendered are set dynamically based on the instantaneous charges of third party communications services providers as a function of where and when a communication takes place across that third party's communications infrastructure as well as the quality of service provided. In these instances the billing computer associated with the access portal, in accordance with its software programming, adjusts the rates charged for various services in accordance with the instantaneous costs of the third party communications services providers. In this way, tracking devices and access portals that are in transit across the globe may update billing rates in accordance with the actual costs of communications in various parts of the world. Of course, fixed rate billing for the communication services rendered are not precluded by the present invention.

In still other embodiments, tracking device 8 analyzes the data that it receives from one or more RFID tags and determines if a scheduled transmission time should be advanced. For example, a particular RFID tag may be read in accordance with a first schedule such as, for example, once every hour, and if the tag is still present and does not report any sensor data that is out of a pre-determined range, then tracking device 8 may simply log this input data and save it for transmission in accordance with a second schedule such as, for example, once every 12 hours. However, if the tag is not present, or if the tag is present, but a sensor reports a condition such as, for example, a temperature that is outside of a pre-determined range, then tracking device 8 may determine, in accordance with its software programming, that a transmission to one or more remote entities should be made in advance of the normally scheduled transmission. In this way, message traffic is reduced as a whole, but urgent information is still communicated in a timely manner to the one or more concerned remote entities.

As discussed earlier in this disclosure, tracking devices 8 may receive service requests, or queries, from remotely located tracking entities, in connection with acquiring and/or forwarding information regarding one or more RFID tags. It is noted that such requests may include command information defining what information is to be gathered, from what RFID tags it is to be gathered, and where the information is to be sent. Processing module 13 of tracking devices 8 is responsible, in accordance with its software programming, for interpreting this command information and for carrying out the requests of the remote tracking entity.

In some embodiments of the invention, tracking device 8 specifies the selection of a Quality of Service (QoS) that is desired for a particular communication with a remote entity. For example, a communication service that provides more rapid or more reliable data delivery may be specified, even if that communication service is more expensive than one that provides less rapid or less reliable data delivery. Such QoS selections may be based on factors such as, but not limited to, the amount of money that a remote entity is willing to spend to receive information, and/or upon the urgency of the data to be communicated. These factors and the ability to make decisions regarding selection of communication QoS may be programmed in the software of tracking device 8.

In some embodiments of the present invention, tracking devices 8 are responsive to local service requests, rather than, or in addition to, being responsive to service requests from remote tracking entities. In one illustrative example, a transport company, rather than shipper or receiver, may be interested in monitoring environmental conditions within a cargo container. In such a case, the transport company, generates a local request (e.g., at a warehouse, or on a ship) and the tracking devices 8 recognize the command and respond by providing temperature readings from throughout a container, or warehouse. In one embodiment, the temperature sensors are queried by tracking devices 8 and the current data is provided. In an alternative embodiment, such temperature readings may be reported from previous temperature readings stored within the memories of tracking devices 8.

Figure 7:
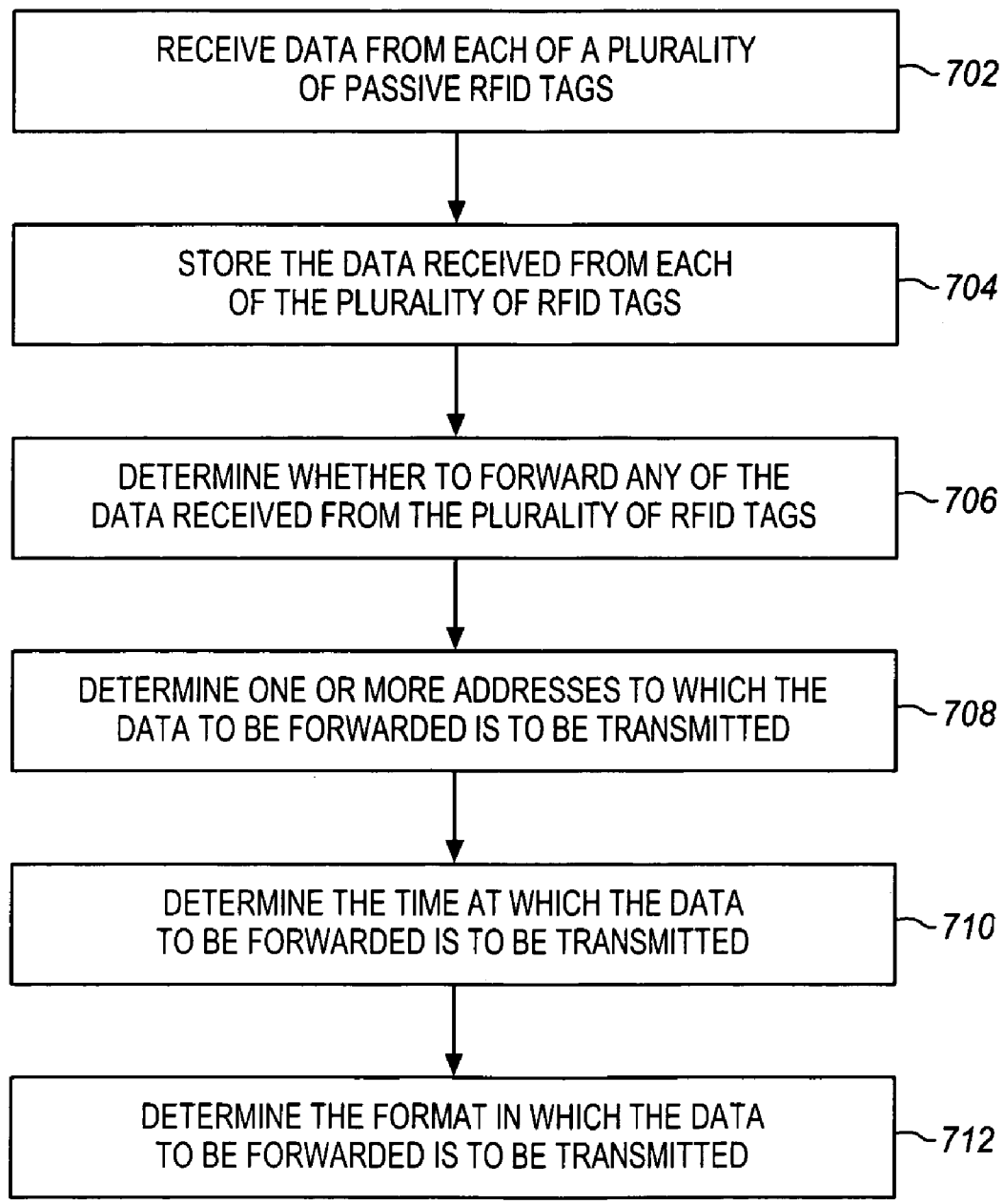
FIG. 7 is a flow diagram illustrating a method in accordance with the present invention.

Referring to FIG. 7, a method in accordance with the present invention is described. More particularly, a method for aggregating and communicating information, includes receiving 702 data from each of a plurality of passive RFID tags; storing 704 the data received from each of the plurality of RFID tags; determining 706 whether to forward any of the data received from the plurality of RFID tags; determining 708, if the determination of 706 is affirmative, one or more addresses to which the data to be forwarded is to be transmitted; determining 710 the time at which the data to be forwarded is to be transmitted; and determining 712 the format in which the data to be forwarded is to be transmitted; wherein the data received from each of the plurality of RFID tags includes at least an identification code unique to each of the plurality of RFID tags.

It will be appreciated that variations of tracking device 8 shown in FIGS. 2, 5, and 6, fall within the scope of the present invention. For example, tracking device 8 shown in FIG. 6 may have a wireless communication module 14 instead of cellular communication module 26 among other variations.

The item tracking system and device of the present invention is not limited to being applied to supply chain management uses. For example, tracking device 8 of FIG. 6 may be used in parenting applications to safeguard children. For example, tracking device 8 of FIG. 6 may have a wireless communication module 13. A tracking device 8 is fitted to a parent and a child with each tracking device being in communication with each other. Tracking device 8 fitted to the parent can continually poll the child tracking device and query its GPS location. The parent's tracking device is pre-programmed to alert the parent, either by audio means, visual means or tactile means, when the child's tracking device is located more than a certain distance from the parent's tracking device. Hence, the parent can keep track of a young child.

Other applications may also exist, such as a child's tracking device notifying a parent's tracking device when the child enters a predetermined location, such as a pool area of the like.

A significant advantage offered by the tracking system and device of the present invention is the feature that passive RFID tag information can be communicated over the Internet to relevant tracking authority. In this way, data is synchronized between tracking authorities and a truly transparent supply chain is provided.

Furthermore, the use of GPS on the tracking devices allows high valued assets to be tracked throughout the supply chain with their exact location known at all times. This allows for the possibility that the tracking device can be pre-programmed to respond to certain conditions (outside a predetermined are, etc.) and notify a tracking entity of these conditions.

Additionally, the provision of a tracking device that has the capacity to alert a party based on alert conditions that can be programmed into a chip of the tracking device is a significant advantage over conventional tracking devices. Furthermore, a tracking device that has the capacity to comply with a wide variety of communication protocols allows for the delivery of a flexible item tracking device and system.

Conclusion

Various illustrative embodiments of the present invention have been described, including methods and apparatus for allowing a one or more tracking devices to collect data from a plurality of passive RFID tags, format the data in accordance with a desired protocol, and transmit the data on behalf of the passive RFID tags, to one or more authorized, remotely located entities, even if those entities require differently formatted data.

It will be appreciated that the systems, methods, devices, and apparatus of the present invention may be applied to a wide variety of applications other than item tracking in a supply chain.

An advantage of some embodiments of the present invention is that multiple parties, each with different software and systems, can be kept informed regarding the location and status of items in transit.

A further advantage of some embodiments of the present invention is that transport companies can provide tracking and environmental status information to remotely located parties such as shippers and receivers. Furthermore, since these value-added services provided to remotely located entities can be accurately monitored, transport companies may increase their revenues by charging for such services.

It is to be understood that the present invention is not limited to the embodiments described above, but may encompass any and all embodiments within the scope of the subjoined claims and their equivalents.

What is claimed is:

1. A method comprising:
   receiving at a tracking device that is also an RFID (Radio Frequency Identification) tag, data from each of a plurality of RFID tags, the received data including an identification code for each RFID tag;
   storing the received data at the tracking device;
   aggregating received data from one of the plurality of RFID tags with previously received data from the RFID tag and with received data from another one of the plurality of RFID tags, the aggregating being at the tracking device using rules within the tracking device;
   packaging the aggregated, received data at the tracking device in an appropriate format for transmission; and
   transmitting the aggregated received data from the tracking device to a remote tracking entity based on rules stored within the tracking device.

2. The method of claim 1, further comprising determining at the tracking device a format in which the received data is to be transmitted and wherein packaging comprises packaging the received data into data packets that conform to the determined format.

3. A method comprising:
   receiving data from each of a plurality of RFID (Radio Frequency Identification) tags at a tracking device that is also an RFID tag, based on rules stored within the tracking device, the received data including an identification code for each RFID tag;
   storing the received data at the tracking device;
   determining at the tracking device a time of receipt for receiving the data based on rules within the tracking device;
   aggregating received data at the tracking device from one of the plurality of RFID tags with received data from another one of the plurality of RFID tags;
   adding a timestamp representing the determined time to the received data;
   packaging the aggregated, received data in an appropriate format for transmission; and
   transmitting the aggregated data from the tracking device to a remote tracking entity.

4. The method of claim 3, further comprising determining at the tracking device a network address to which the aggregated, packaged data is to be transmitted.

5. A method comprising:
   receiving data from each of a plurality of RFID (Radio Frequency Identification) tags at a tracking device that is also an RFID tag, based on rules stored within the tracking device, the received data including an identification code for each RFID tag;

storing the received data at the tracking device;
determining at the tracking device, based on rules within the tracking device, a location of a respective one of the RFID tags;
aggregating at the tracking device, received data from one of the plurality of RFID tags with received data from another one of the plurality of RFID tags;
adding the determined location to the received data;
packaging the aggregated, received data in an appropriate format for transmission; and
transmitting the aggregated data from the tracking device to a remote tracking entity.

6. A method comprising:
receiving data from each of a plurality of RFID (Radio Frequency Identification) tags at a tracking device that is also an RFID tag, based on rules stored within the tracking device, the received data including an identification code for each RFID tag;
storing the received data at the tracking device;
aggregating at the tracking device, received data from one of the plurality of RFID tags with received data from another one of the plurality of RFID tags;
packaging the aggregated, received data in an appropriate format for transmission;
determining at the tracking device addresses to transmit received data from at least one of the plurality of RFID tags to more than one remote entity at the tracking device based on rules within the tracking device;
determining at the tracking device a format for each remote entity; and
transmitting the aggregated data from the tracking device to a remote tracking entity.

7. A method comprising:
receiving data from each of a plurality of RFID (Radio Frequency Identification) tags at a tracking device that is also an RFID tag, based on rules stored within the tracking device, the received data including an identification code for each RFID tag;
storing the received data at the tracking device;
aggregating at the tracking device received data from one of the plurality of RFID tags with received data from another one of the plurality of RFID tags;
packaging the aggregated, received data in an appropriate format for transmission;
determining the time at which the aggregated, received data is to be transmitted at the tracking device based on rules stored within the tracking device; and
transmitting the data to be forwarded from the tracking device to a remote tracking entity.

8. A method comprising:
receiving data from each of a plurality of RFID (Radio Frequency Identification) tags at a tracking device that is also an RFID tag, based on rules stored within the tracking device, the received data including an identification code for each RFID tag;
storing the received data at the tracking device;
aggregating received data from one of the plurality of RFID tags with received data from another one of the plurality of RFID tags at the tracking device based on rules stored within the tracking device;
packaging the aggregated, received data in an appropriate format for transmission;
determining whether to forward any of the data received from the plurality of RFID tags at the tracking device based on rules stored within the tracking device; and
transmitting the data to be forwarded from the tracking device to a remote tracking entity.

9. A method comprising:
receiving data from each of a plurality of RFID (Radio Frequency Identification) tags at a tracking device that is also an RFID tag, based on rules stored within the tracking device, the received data including an identification code for each RFID tag;
receiving additional data from at least a portion of the RFID tags at a later time at the tracking device;
detecting at the tracking device whether any previous RFID tags are not present based on rules within the tracking device;
storing the received data at the tracking device;
aggregating received data from one of the plurality of RFID tags with received data from another one of the plurality of RFID tags;
packaging the aggregated, received data in an appropriate format for transmission at the tracking device based on rules within the tracking device; and
sending an alert message from the tracking device to one or more tracking entities, if any previous RFID tags are not present.

10. A method comprising:
receiving data from a first RFID tag at a second RFID tag, the first RFID tag being associated with a first mobile asset to track the first mobile asset and the second RFID tag being associated with a second mobile asset to track the second mobile asset, the second mobile asset moving with the first mobile asset;
receiving data at the second RFID tag from a plurality of RFID tags, each associated with a different mobile asset to track each respective mobile asset;
storing the data received from the first RFID tag at the second RFID tag;
aggregating at the second RFID tag, the received data from each of the plurality of RFID tags including combining received data from the first RFID tag with previously received data from the first RFID tag autonomously based on rules within the second RFID tag;
sending the stored data from the second RFID tag to a third RFID tag, the third RFID tag being associated with a third mobile asset to track the third mobile asset;
reporting changes in the compiled data from the second RFID tag to the third RFID tag based on rules stored within the second RFID tag; and
sending the data received from the second RFID tag from the third RFID tag to a network interface based on rules stored within the third RFID tag.

11. The method of claim 10, wherein the first tag and the second tag are both active, self-powered RFID tags.

12. The method of claim 10, wherein the data received from the first RFID tag includes environmental data sensed by the first RFID tag.

13. The method of claim 10, wherein the first RFID tag is attached to an asset; the asset is attached to a pallet, the second RFID tag is disposed on the pallet; the pallet is disposed within a container; and the third RFID tag is disposed on the container.

14. A method comprising:
receiving data from a first RFID tag at a second RFID tag, the first RFID tag being associated with a first mobile asset to track the first mobile asset and the second RFID tag being associated with a second mobile asset to track the second mobile asset, the second mobile asset moving with the first mobile asset;
storing the data received from the first RFID tag at the second RFID tag;

determining an address at the second RFID tag based on rules within the second RFID tag to which the received data is to be transmitted;

determining at the tracking device a format at the second RFID tag in which the received data is to be transmitted to the determined address;

aggregating received data from the first RFID tag with data received from another RFID tag at the second RFID tag based on rules within the second RFID tag;

packaging the aggregated, received data in the determined format for transmission to the determined address;

sending the stored data from the second RFID tag to a third RFID tag based on rules stored within the second RFID tag, the third RFID tag being associated with a third mobile asset to track the third mobile asset; and sending the data received from the second RFID tag from the third RFID tag to a network interface based on rules stored within the third RFID tag.

15. The method of claim 14, further comprising:

receiving data at the second RFID tag from a plurality of RFID tags, each associated with a different mobile asset to track each respective mobile asset;

aggregating the received data from each of the plurality of RFID tags; and reporting changes in the compiled data to the third RFID tag.

16. A tacking device comprising:

a position determination system to determine the position of the tracking device;

an RFID (Radio Frequency Identification) communication module to communicate with an RFID tag, and to receive data from the RFID tag, the received data including an identification code for the RFID tag;

a processing module coupled to the RFID communication module operating autonomously based on rules stored within the tracking device, to store the received data, to aggregate received data from the RFID tag with previously received data from the RFID tag, and to package the aggregated, received data in a format for transmission; and a wireless communication module coupled to the processing module, to send the determined position of the tracking device, and to send a package of aggregated, received data from the tracking device to a remote tracking entity.

17. A tracking device comprising:

a position determination system to determine the position of the tracking device;

an RFID (Radio Frequency Identification) communication module to communicate with a plurality of RFID tags, and to receive data from each of the plurality of RFID tags, the received data including an identification code for each RFID tag;

a processing module coupled to the RFID communication operating autonomously based on rules stored within the tracking device, to determine a time of receipt for receiving the data, to store the received data, to aggregate received data from one of the plurality of RFID tags with received data from another one of the plurality of RFID tags, adding a timestamp representing the determined time to the received data, and to package the aggregated, received data in a format for transmission; and a wireless communication module coupled to the processing module, to send the determined position of the tracking device, and to send a package of aggregated, received data from the tracking device to a remote entity.

18. The tracking device of claim 17, wherein the wireless communication module comprises a cellular telephone module.

19. The tracking device of claim 17, further comprising an RFID energizing circuit coupled to the processing module through the RFID communications module.

20. The tracking device of claim 17, wherein the processor module is operable to aggregate data from multiple passive RFID tags, and to determine one or more destination addresses for the aggregated data.

21. A tracking device comprising:

a position determination system to determine the position of the tracking device;

an RFID (Radio Frequency Identification) communication module to communicate with an RFID tag, and to receive data from the RFID tag, the received data including an identification code for the RFID tag;

a processing module coupled to the RFID communication module operating autonomously based on rules stored within the tracking device, to determine a location of the RFID tag, to store the received data, to aggregate received data from the RFID tag with the determined location of the RFID tag, and to package the aggregated, received data in a format for transmission; and a wireless communication module coupled to the processing module to send the determined position of the tracking device, and to send a package of aggregated, received data from the tracking device to a remote entity.

22. A tracking device comprising:

a position determination system to determine the position of the tracking device;

an RFID (Radio Frequency Identification) communication module to communicate with a plurality of RFID tags, and to receive data from each of the plurality of RFID tags, the received data including an identification code for each RFID tag;

a processing module coupled to the RFID communication module operating autonomously based on rules stored within the tracking device, to store the received data, to aggregate received data from one of the plurality of RFID tags with received data from another one of the plurality of RFID tags, to determine addresses to transmit the received data from at least one of the plurality of RFID tags to more than one remote entity, to determine a format for each remote entity, and to package the aggregated, received data in the determined formats for transmission; and a wireless communication module coupled to the processing module, to send a package of aggregated, received data to the more than one remote entities.

23. A tracking device comprising:

a position determination system to determine the position of the tracking device;

an RFID (Radio Frequency Identification) communication module to communicate with a plurality of RFID tags, and to receive data from each of the plurality of RFID tags, the received data including an identification code for each RFID tag;

a processing module coupled to the RFID communication module operating autonomously based on rules stored within the tracking device, to store the received data, to aggregate received data from one of the plurality of RFID tags with received data from another one of the plurality of RFID tags, to package the aggregated, received data in the determined format for transmission, and to determine the time at which the aggregated, received data is to be transmitted; and a wireless communication module coupled to the processing module, to send the determined position of the tracking device, and to send a package of aggregated, received data from the tracking device to a remote entity.

24. A tracking device comprising:
a position determination system to determine the position of the tracking device;
an RFID (Radio Frequency Identification) communication module to communicate with a plurality of RFID tags, and to receive data from each of the plurality of RFID tags, the received data including an identification code for each RFID tag;
a processing module coupled to the RFID communication module operating autonomously based on rules stored within the tracking device, to store the received data, to aggregate received data from one of the plurality of RFID tags with received data from another one of the plurality of RFID tags, to package the aggregated, received data in the determined format for transmission, and to determine whether to forward any of the data received from the plurality of RFID tags; and
a wireless communication module coupled to the processing module, to send the determined position of the tracking device, and to send a package of aggregated, received data from the tracking device to a remote entity.

25. A tracking device comprising:
a position determination system to determine the position of the tracking device;
an RFID(Radio Frequency Identification) communication module, to communicate with a plurality of RFID tags, to receive data from each of the plurality of RFID tags, the received data including an identification code for each RFID tag, and to receive additional data from at least a portion of the RFID tags at a later time;
a processing module coupled to the RFID communication module operating autonomously based on rules stored within the tracking device, to store the received data, to aggregate received data from one of the plurality of RFID tags with received data from another one of the plurality of RFID tags, to package the aggregated, received data in the determined format for transmission, and to detect whether any previous RFID tags are not present; and
a wireless communication module coupled to the processing module, to send the determined position of the tracking device, to send a package of aggregated, received data, and to send an alert message to one or more tracking entities, if any previous RFID tags are not present.

* * * * *